United States Patent [19]

Terrington

[11] Patent Number: 4,572,566
[45] Date of Patent: Feb. 25, 1986

[54] SLAB LIFTER

[76] Inventor: John C. Terrington, 23, Burnt St., Wells-Next-The-Sea, Norfolk, NR23 1HP, England

[21] Appl. No.: 545,256

[22] Filed: Oct. 25, 1983

[30] Foreign Application Priority Data

Oct. 26, 1982 [GB] United Kingdom ............... 8230533
May 5, 1983 [GB] United Kingdom ............... 8312300

[51] Int. Cl.$^4$ .............................................. B25B 7/02
[52] U.S. Cl. .................................................. 294/118
[58] Field of Search ................ 294/118, 119, 106, 16, 294/1 R, 19 R

[56] References Cited

U.S. PATENT DOCUMENTS 1,344,174  6/1920  Clogston ........................... 294/118
1,514,863  11/1924 Rytell ................................ 294/118
1,805,604  5/1931  Straka ............................... 294/118

Primary Examiner—James B. Marbert
Attorney, Agent, or Firm—Cushman, Darby & Cushman

[57] ABSTRACT

This invention relates to a simple tool which can be used by two people manually to lift and position slabs of various thicknesses.

A slab lifter according to the invention comprises two bars adapted to rotate with respect of each other about a mutually perpendicular axis, each bar having at one end a slab-gripping portion bent at an obtuse angle A of 100 to 140 degrees towards the position of the slab-gripping portion of the other bar so that it can be inserted between adjacent slabs and together with the other slab-gripping portion can grip opposite edges of a slab to distance L apart, the distance from the axis of rotation to the slab-gripping portion of the bar being approximately equal to 0.5 L/sine (A+a) where a is an angle of zero to 5 degrees representing "toe-in" of the slab-gripping portion when gripping the slab, and the rest of the bar on the other side of the axis of rotation being of such length and shape that it can project laterally at least as far as the vertical plane of the opposite edge of a gripped slab so as to provide a handle.

12 Claims, 15 Drawing Figures

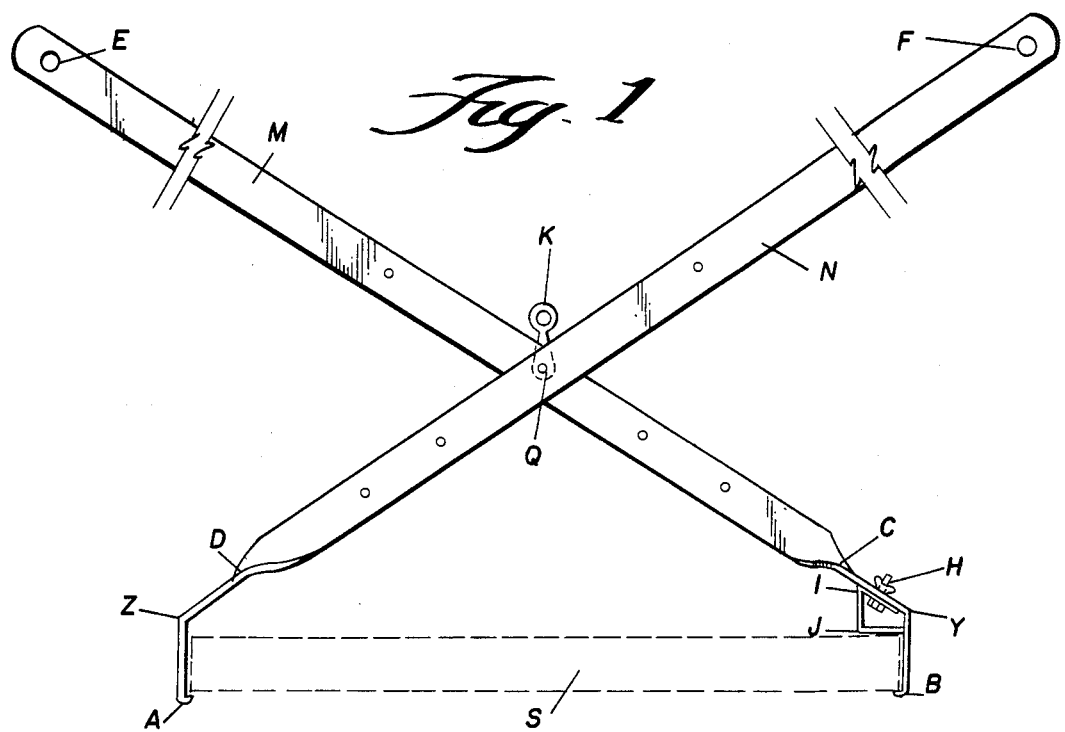
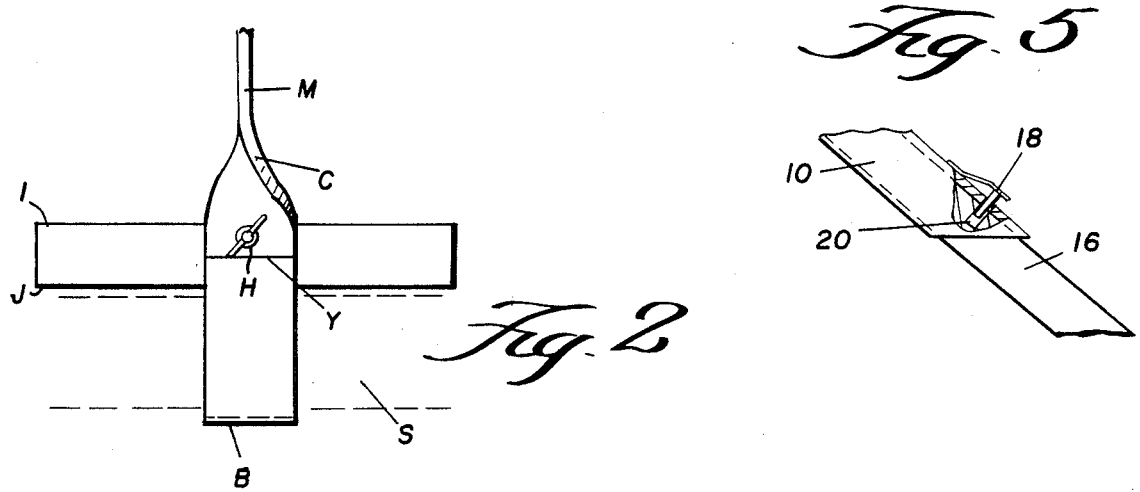
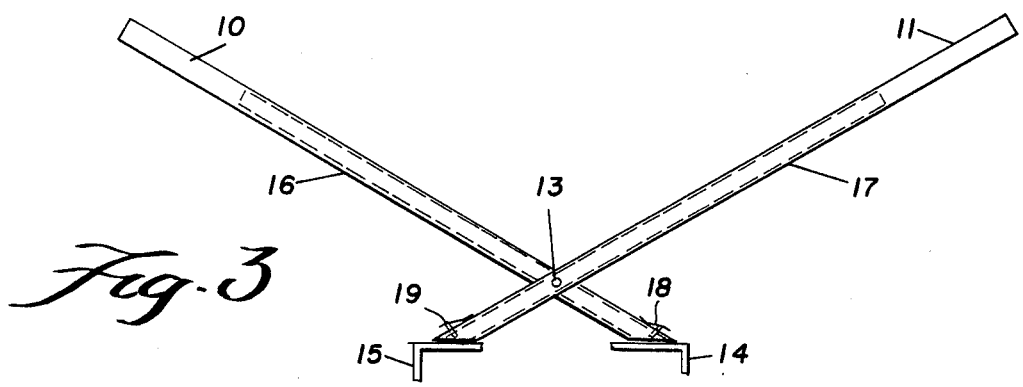

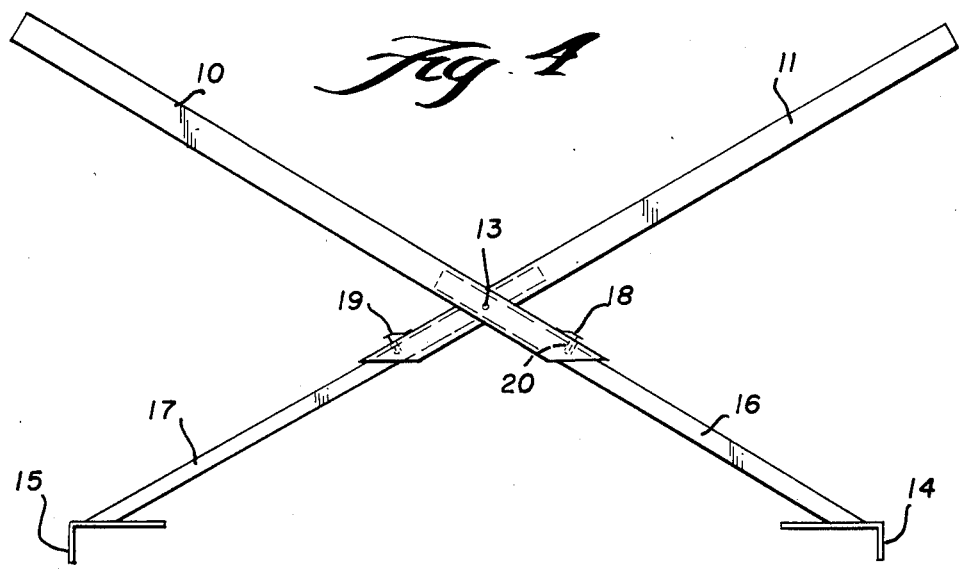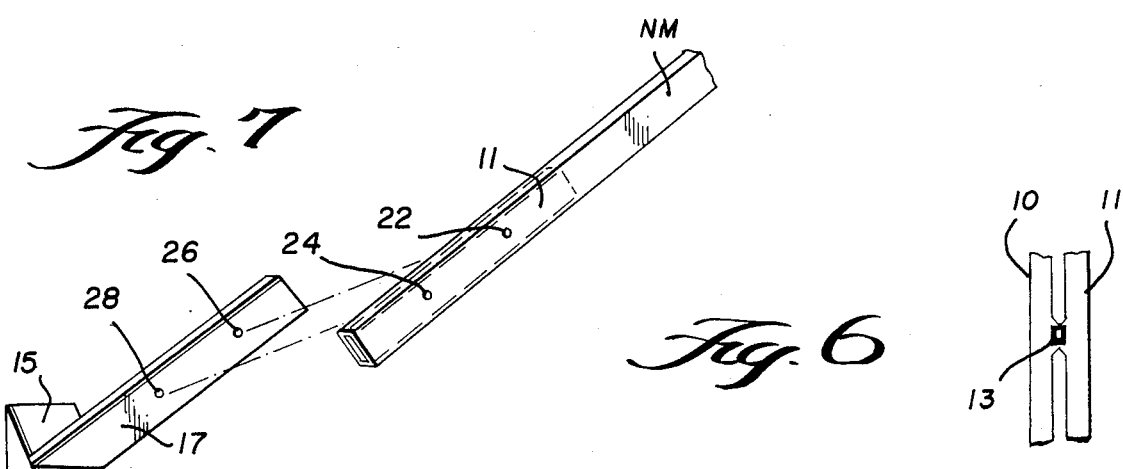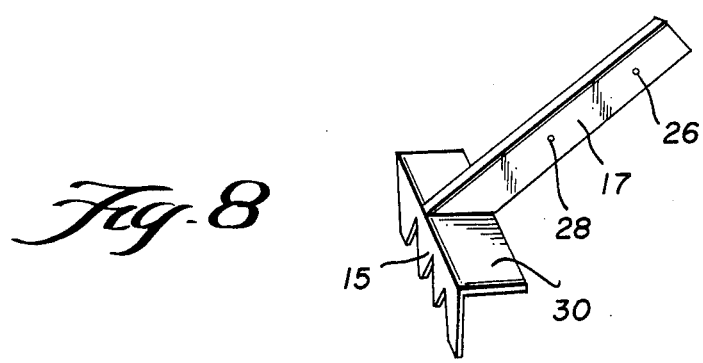

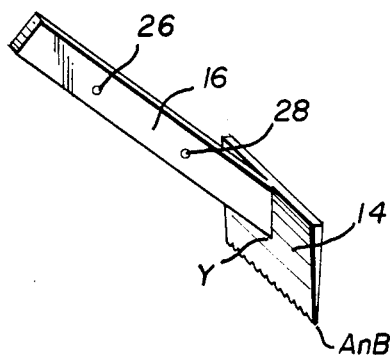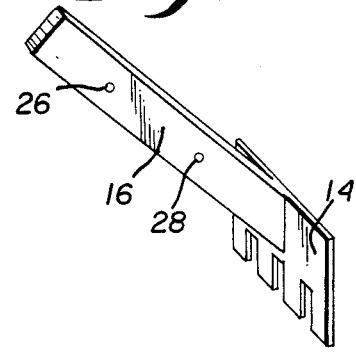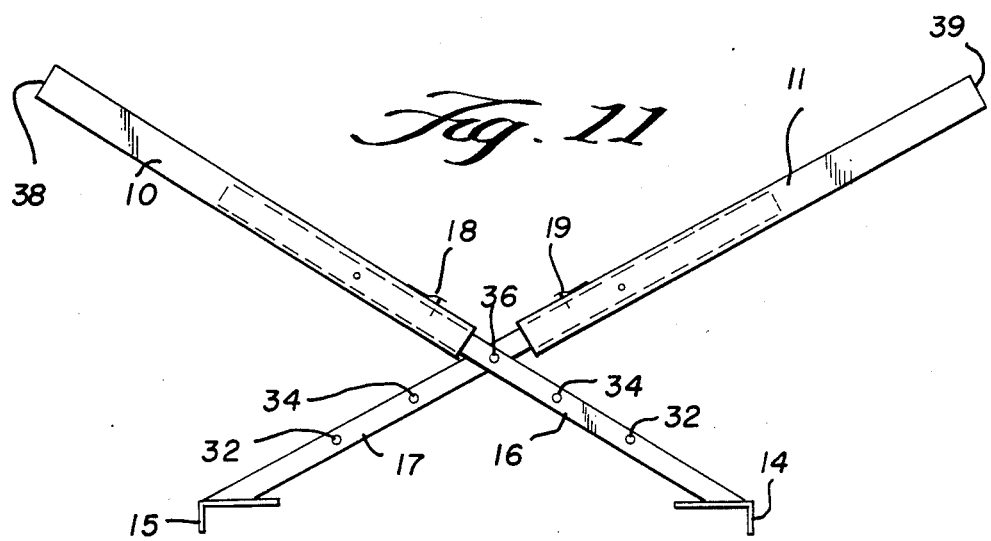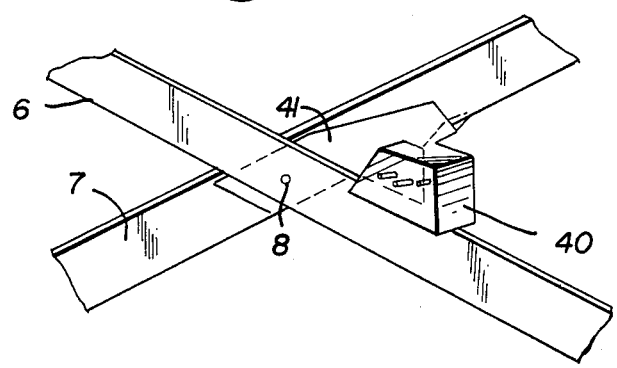

SLAB LIFTER

This invention relates to a simple tool which can be used by two people manually to lift and position slabs of various thicknesses.

A slab lifter according to the invention comprises two bars adapted to rotate with respect of each other about a mutually perpendicular axis, each bar having at one end a slab-gripping portion bent at an obtuse angle A of 100 degrees to 140 degrees towards the position of the slab gripping portion of the other bar so that it can be inserted between adjacent slabs and together with the other slab-gripping portion can grip opposite edges of a slab of distance L apart, the distance from the axis of rotation to the slab-gripping portion of the bar being approximately equal to 0.5 L/sine (A+a) where a is an angle of zero to 5 degrees representing "toe-in" of the slab-gripping portion when gripping the slab, and the rest of the bar on the other side of the axis of rotation being of such length and shape that it can project laterally at least as far as the vertical plane of the opposite edge of a gripped slab so as to provide a handle.

The obtuse angle A is preferably 115 to 125 degrees.

The slab-gripping portions may be parallel (and generally vertical) when gripping the slab or they may converge slightly with a "toe-in" angle a on each of up to 5 degrees.

The angle (A+a) is related to the angle B between the lower parts of the bars at the axis of rotation in an ideal gripping position by the formula:

$$B = 360 \text{ degrees} - 2(A+a).$$

Thus, assuming a is zero, when the obtuse angle A is 120 degrees B is also 120 degrees and this is about the optimum. Gripping is possible, however, with values of B between 70 and 155 degrees.

Conveniently, each bar of the slab lifter is flat in the plane of rotation and the slab-gripping portion is formed at one end by a right-angle twist, the part beyond the twist being bent at the requisite obtuse angle A.

The distance from the axis of rotation to the slab-gripping portion of the bars in the slab lifter can preferably be varied to suit different gripping distances L, thus enabling the slab lifter to be used with various sizes of slab. For example, the bars may be bolted together in various positions to take 12 inch (0.30 meters), 18 inches (0.46 m), 24 inches (0.61 m) and 36 inches (0.91 m) slabs while also accommodating many in-between sizes.

Alternatively each bar may be composed of releasably secured elements relatively movable longitudinally for adjustment in length. In this way the distance between the axis of rotation to the slab-gripping portion can be altered without changing the place of the axis of rotation. Similarly the length of the other part of the bar (i.e. the distance from the axis of rotation to the handle) may be varied independently of the distance from the axis of rotation to the slab-gripping portion. This is conveniently achieved by constructing the bars from a hollow piece which slides over a solid piece, with means to fix the relative positions of the pieces in any desired position. For example, a hollow handle section may be fitted over a solid main bar containing several locations for the axis of rotation and formed into a slab-gripping portion at the lower end. Alternatively the main bar including the handle may be hollow with a single site for the axis of rotation, and the slab-gripping portion may be formed on a solid element which fits into the lower part of the main bar.

The bars may conveniently be straight, but when they are gripping at an angle B of less than 110 degrees the position of the axis of rotation can be too high unless the handles are curved outwardly or set parallel to the upper surface of the slab. Such shaped handles are required, for example, to lift a 24 inch (0.61 m) slab at values of B below 80 degrees (preferably below 90 degrees) and to lift a 36 inch (0.91 m) slab at values of B below 110 degrees; in the later case values of B below 95 degrees are impracticable.

Two people each holding one of the handles can lift a slab by dropping the slab-gripping portions centrally over opposite edges of the slab and then raising the handles to grip the slab and lift it safely from its position. The length and shape of the handle part allows them to stand clear of the slab edges and also have a mechanical advantage promoting effective gripping. Using the slab lifter they can carry the slab and lower it into position, placing it against other slabs with a small acceptable joint, without unduly bending their backs or risking their fingers.

It may also be possible for one person alone to use the slab lifter, particularly on slabs which are not too large and heavy, by holding both handles.

If a slab already in position is on too high a bed or has dropped, over the years, the slab-gripping portions of the slab lifter are pushed into the joints along opposite edges so that the slab can then be raised and removed. The slab lifter can also be used to replace that slab.

The slab lifter may be used for lifting many kinds of objects. For example, it may be used to grip lengths of pipe for laying land drains end to end in trenches up to 1 meter in depth. It may be used to lift and position various types of curb stones and for moving objects such as concrete bicycle stands. A slab lifter having suitably narrow slab-gripping portions, preferably turned in slightly at the bottom edge to provide short grabs, may also be used for raising manhole covers and for removing certain types of drain covers. By attaching ropes to the handles and also one rope to the axis of rotation, the slab lifter may be dropped down wells or pits to retrieve objects. Other uses include raising duck boards and pit boards and raising many kinds of objects when submerged in up to 1 meter of water. The slab lifter may also be used for removing objects from fires.

The slab-gripping portions may each be longer than the thickness of the slab to be lifted and may end in a short grab for the slab e.g. of about ¼ inch (6 mm). The grabs must be sufficiently small to fit within the joints between adjacent slabs. For many purposes, however, the slab-gripping portions may be without a terminal grab in which case it need not be as long as the thickness of the slab. The bottom edge may be serrated to grip other objects as well as slabs.

The slab-gripping portion is preferably flat to bear on the edge of the slab or consists of at least two spaced-apart prongs or tines to bear on the edges of the object to be lifted. Various fork-shaped configurations are possible.

The slab lifting portion may be 1½ inches to 18 inches (35 to 460 mm) and preferably 2 to 6 inches (50 to 155 mm) across. It is preferably 1½ to 3 inches (35 to 75 mm), desirably about 2 inches (50–60 mm) from top to bottom. It may be formed integrally with a stabilizer to bear horizontally on the upper surface of the slab adjoining the edge or a length in from the edge of ½ inch to 6 inches (10 to 155 mm), preferably 1½ to 3 inches (35–80 mm). Alternatively such a stabilizer as a seperate element may be fitted to one or both bars immediately above and transverse to the slab-gripping portion. The fitting may be adjustable to allow adjustments of the position of the stabilizer up the bar. Such a stabilizer may be useful when lifting uneven natural stone or broken concrete blocks when the balance is distorted. However, the slab lifter will perform most tasks without this attachment.

Different types of slab lifting portions are readily interchangeable when this forms part of an element seperate from but releasably secured to the rest of the bar. The same is true for the handle element when this is seperate.

Means may be fitted to the slab lifter to interact with both bars near to the axis of rotation so as to maintain them releasably in a slab-gripping position. Such means may comprise, for example, a resilient block of elastomeric material mounted laterally between the bars or a counterbalanced pawl mounted on the upper part of one bar interacting with a ratchet on the lower part of the other bar.

In the drawings:

FIG. 1 shows the slab lifter according to the invention viewed from one side;

FIG. 2 shows on a larger scale a partial end view of the slab lifter of FIG. 1;

Figure 13:
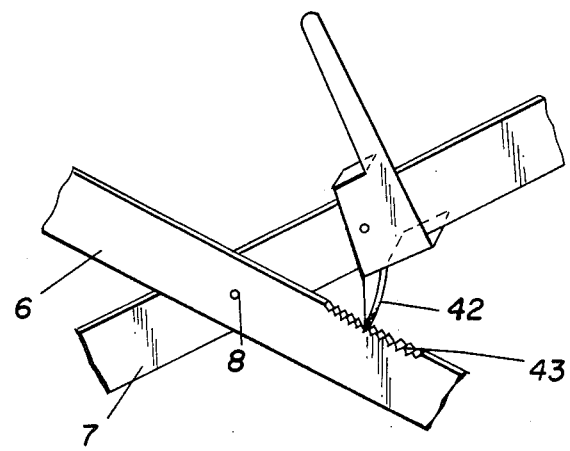
Figure 14:
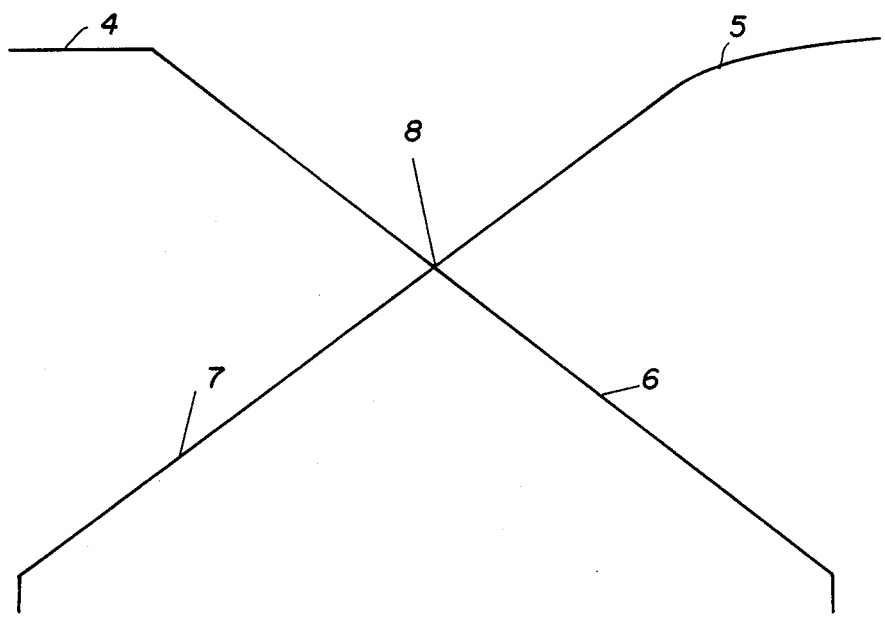

FIGS. 3 and 4 show a slab lifter in which the bars have seperate slab lifting portions, set for gripping 12 inch (0.30 m) and 36 inch (0.91 m) slabs respectively;

FIG. 5 shows on a larger scale the means employed in the slab lifter of FIGS. 3 and 4 for releasably securing the two elements of the bar;

FIG. 6 shows an end view on a larger scale of the pivot at the axis of rotation of the bars in the slab lifter of FIGS. 3 and 4;

FIG. 7 shows seperately in perspective a slab-gripping element and the lower part of the main element of a bar similar to those of the slab lifter of FIGS. 3 and 4 but with different means for releasably securing the two elements;

FIGS. 8, 9 and 10 show in perspective other types of slab-gripping elements for use in association with the main bar element of FIG. 7;

FIG. 11 shows a side view of a slab lifter in which the bars have seperate handle portions;

FIG. 12 is a partial view in perspective of the side of a slab lifter showing a resilient block of elastomer mounted laterally between the bars;

FIG. 13 is a partial view in perspective of the side of a slab lifter showing interaction between the bars by means of a pawl and ratchet;

FIG. 14 is a diagram illustrating alternative shapes of handle.

Figure 15:
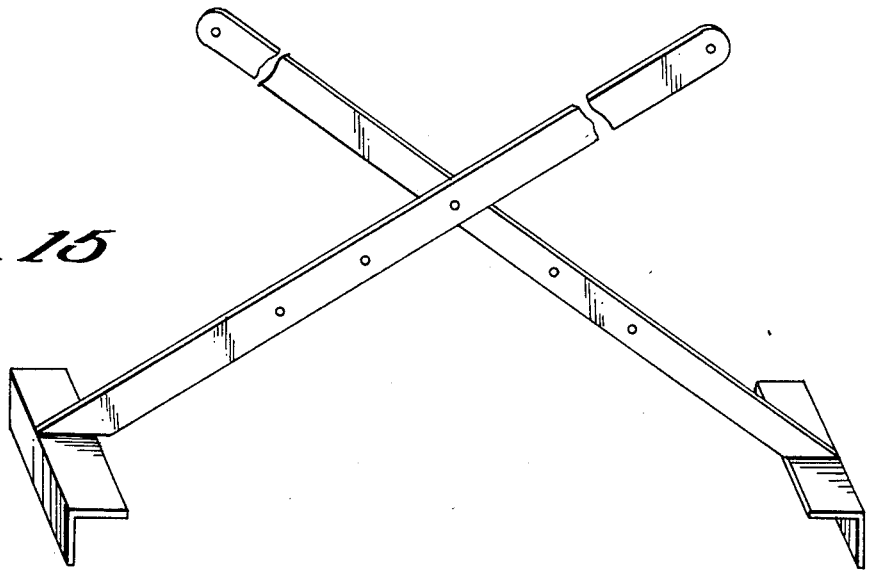

FIG. 15 is a view in perspective of a preferred form of slab lifter.

In the slab lifter shown by way of example in FIGS. 1 and 2, two flat bars M and N each have a right-angle twist C, D beyond which the bar is bent at an obtuse angle of 120 degrees at Y, Z to provide vertical slab-gripping portions each terminating in a short grab B, A. The other end of the bar is a handle E, F. The length of each bar from the twist C, D to the handle E, F is 1.12 meters (44 inches). The bars are loosely held together at Q by a 6.4 mm (¼ inch) bolt, wit spring friction washer and nut, or a pin with spring holding clip complete with washer or spring friction washer passing through holes in the bars to serve as an axis of rotation and dividing each bar into a handle portion EQ, FQ and a gripping portion BYQ, AZQ. The holes in the bar at Q represent an adjustment to grip a slab S having a length between opposite edges of 0.61 meters (24 inches). The distance from Q to the beginning of the slab-gripping portion of each bar at C, D is approximately equal to ½ L/sine A where L is 0.61 meters and A is 120 degrees (as shown in FIG. 1, this distance is actually 0.37 meters (14½ inches) and therefore slightly greater than the distance of 0.352 meters (13.86 inches) prescribed by the mathematical formula).

Each bar has a series of other holes for coupling the bars together, representing adjustments to grip 0.30 meters, 0.46 meters and 0.91 meters (12 inch, 18 inch and 36 inch) slabs respectively instead of the 0.61 meters (24 inches) slab catered for by coupling at Q. Even when the bars are coupled through the holes for the 0.91 meter slab (i.e. the holes shown between Q and E and between Q and F, the distance from these holes to the slab-gripping portion of each bar at Y and Z is only 0.53 meters (20¾ inches) which is less than the distance from the holes to the handles E and F of 0.65 meters (25¾ inches).

The slab-gripping portion of each bar beyond Y and Z is 63.5 mm (2½ inches) long and terminates in a 3.2 mm (⅛th inch) grab at B and A respectively.

FIG. 1 shows an adjustable stabilizer fitted to one bar between the twist C and the beginning of Y of the slab-gripping portion. The stabilizer, the fitting of which is shown in more detail in FIG. 2, consists of an 0.18 meter (7¼ inches) long piece of 32 mm (1¼ inch) channel iron with the top side angled at I to fit the angle of the bar between C and Y and with the bottom side J horizontal to bear on the top of the slab. The top side has a centrally positioned slot 6.4 mm (¼ inch) wide extending in the direction of the bar for a length of 25 mm (1 inch). A 6.4 mm (¼ inch) bolt with a butterfly nut H passes through the slot and through the hole (not shown) in the bar between C and Y so as to fasten the stabilizer to the bar and allow adjustment of its position up the bar by the length of the slot.

The handles E and F, instead of being raised directly by a person on each, may be lifted by ropes passing through holes in the bars near the ends as shown in FIG. 1. A third rope may be passed through a central washer hole K linked to the bolt at Q to drop the slab lifter down a pit or well for retrieving an object which can then be lifted using the ropes through the handles.

In a slab lifter of alternative construction not shown in the drawings, the slab-gripping portion is 51 mm (2 inches) long and about the same thickness of the slab S, and has no terminal grabs. In all other respects this slab lifter is the same as the slab lifter shown in FIGS. 1 and 2. Whether a stabilizer is fitted is a matter of choice and the slab lifter in its simplest construction has neither a stabilizer nor means for attaching one.

In the slab lifter shown by way of example in FIGS. 3 to 6, each bar is composed of two releasably secured elements relatively moveable longitudinally for adjustment of length. The main elements 10, 11 of each bar are of hollow steel of rectangular cross-section having a wall thickness of approximately 1/16th inch (1.6 mm) minimum 29½ inches (0.75 m) long and are permanently pivoted together at a point 23 inches (0.58 m) from the handle end by means of a rivet 13 passing through the pressed out section of the nearest wall of each hollow section and dressed down below the main inner face leaving the interior of the hollow section unobstructed. The slab-gripping portions 14 and 15 of the bars are borne on the ends of solid or hollow section steel elements 16 and 17 which fit inside the hollow sections 10, 11 respectively. If solid, these elements can be an ¼ to 1 inch (6 to 25 mm) in thickness and ¾ inch to 2½ inches (19 to 63 mm) in width.

As shown in more detail in FIG. 5, the elements of the bars are secured together in the desired relative position by fixed spring pins 18 and 19 each mounted on an passing through a hole in the outer hollow section 10, 11 into a hole 20 which is one of a series in predetermined desired locations in the inner element 16, 17. These elements 16, 17 incorporating the slab-gripping portions 14, 15 slide up inside the outer hollow element 10, 11 to the required position to take 36 inch, 24 inch, 18 inch or 12 inch slabs and are secured in the correct position by the spring pins 18, 19.

In FIGS. 7 to 10 the outer hollow element 11 and the inner elements 16 and 17 incorporating various slab-gripping portions 14, 15 are generally similar to the corresponding parts shown in FIGS. 4 and 5 except that the elements are secured together by a pin (not shown) passing through holes 22 or 24 in the outer element and 26 or 28 in the inner element. The slab-gripping portions shown in FIGS. 7 and 8 incorporate a stabilizer 30 to bear on the horizontal surface of the slab. The slab-gripping blades or forks of the two arms of the slab lifter may be parallel (vertical) in the gripping position or they can "toe in" at the bottom by 2 or 5 degrees out of upright.

In the slab lifter shown by way of example in FIG. 11 the main parts 16, 17 of the bars have series of holes 32, 34 and 36 for coupling the bars together as described for the slab lifter of FIG. 1. The main parts 16, 17 of the bars incorporate slab-gripping portions 14, 15 in a fashion analogous to that shown in FIGS. 7 and 8. The handle elements 10, 11 of the bars are formed of steel hollow section similar to that used for the main parts 10, 11 of the bars in FIGS. 3 and 4 and they are releasably secured to the main parts 16, 17 by spring clips 18, 19 operating in predetermined series of holes in the inner elements as described with reference to FIG. 5.

This enables the distance from the axis of rotation (e.g. 36 in FIG. 11) to the handle 38, 39 to be varied independently of the distance from the axis of rotation (e.g. 36) to the slab-gripping portion (14, 15). The handle can thus be made to stick out past the end of any size slab by a convenient amount for lifting; a good position is approximately 4 inches (0.1 m) beyond the vertical plane of the edge of the slab.

The slab-gripping portion of the bars as shown in any of the FIGS. 1, 3 and 4, 7, and 11 may be the same or different on the two bars and each may have any of the configurations described above or shown in FIGS. 1 and 2 and any of FIGS. 7 to 10.

FIGS. 12 and 13 illustrate by way of example the provision of means capable of interacting with both bars 6, 7 near to the axis of rotation 8 so as to maintain them releasably in a slab-gripping position. In FIG. 12 a block 40 of firm elastomeric material is mounted on a plate 41 which is secured to the slab lifter at the axis of rotation 8. When the bars 6, 7 are gripping a slab the block 40 is compressed sufficiently to maintain them in that position. To engage or release the slab, the ends of the bars are momentarily moved to compress the block 40 further. The plate 41 retains the block 40 in position when the slab lifter is not in use. It has one metal stop which fits under the upper bar (7 in FIG. 12). The resilient understop may alternatively be formed by spring steel instead of elastomeric material as in block 40.

In FIG. 13 a counterbalanced pawl 42 is rotatably mounted on the upper bar 7 and interacts with a ratchet 43 on the edge of the lower bar 6. The pawl is formed with a handle to facilitate release from the ratchet and with a stop of either side so that it cannot turn further than its workable arc. The tooth of the pawl automatically selects the correct serration of the ratchet when a slab is gripped and the handles of the slab lifter are raised. It then remains in position gripped to the slab if the operators remove their hands from the handles. Where the slab lifter has a series of holes in the bars to choose from as the axis of rotation, as shown for example in FIGS. 1 and 11, a corresponding series of holes is required in one of the bars for mounting the pawl (these holes conveniently being of a smaller size for ease of identification) and corresponding lengths of the other bar must accordingly be serrated to form the requisite ratchet.

FIG. 14 is a diagram showing how an outwardly curved handle 5 or a horizonally set handle 4 may be provided on a slab lifter for lifting a 36 inch slab at an angle B between the bars 6, 7 of 104 degrees at the axis of rotation 8.

FIG. 15 shows a preferred form of slab lifter, generally efficient to use and relatively cheap to produce, which comprises two straight solid flat bars as described with reference to FIG. 1 but each with an angled lower end on to which is welded a short 0.1 meter (4 inch) piece of 50 mm×50 mm (2 inch×2 inch) of angle iron.

Alternatively a simple slab lifter with pivot holes as seen in FIG. 1, can be made up with two hollow section bars (M N), the grab element can be formed by inserting any type of the grab elements (similar to those shown in FIGS. 7, 8, 9 and 10) but with shorter insert bars which slide inside the hollow sections and are fixed securely.

I claim:

1. A slab lifter which comprises a pair of bars, pivot means for coupling said bars one to another to permit said bars to rotate with respect to each other about a mutually perpendicular axis, each said bar having at one end a slab-gripping portion bent at an obtuse angle A of 100 to 140 degrees towards the position of said slab-gripping portion of the other bar so that said slab-gripping portion can be inserted between adjacent slabs and together with the other slab-gripping portion can grip opposite side edges of a slab of distance L apart, the distance from said axis of rotation to said slab-gripping portion of one of said bars being approximately equal to 0.5 L/sine (A), wherein, said slab lifter further comprises stabilizer means adapted to contact a horizontal upper surface portion of said slab when said slab is gripped between said slab-gripping portions for stabilizing said slab when said slab is gripped by means of said slab gripping portions and lifted, said stabilizer means including a stabilizer member defining a substantially horizontal stabilizing surface and having one end rigidly fixed at a stabilizing position to said one of said bars such that said stabilizer member extends away from said one bar towards the other of said bars, said stabilizing surface thereby contacting said horizontal surface portion when said side edge, adjacent to said horizontal surface portion, is gripped by said gripping member associated with said one bar, and, wherein said bars extend on the other side of the axis of rotation and are of such length and shape that they project laterally at least as far as the vertical plane of the opposite edge of a gripped slab so as to provide handles.

2. A slab lifter according to claim 1 in which the obtuse angle A is 115 to 125 degrees.

3. A slab lifter according to claim 1 in which the obtuse angle A is approximately 120 degrees.

4. A slab lifter according to claim 1 in which the slab-gripping portion is flat so as to bear on the edge of the slab.

5. A slab lifter according to claim 1 in which each bar is flat in the plane of rotation and the slab-gripping portion is formed at one end by a right-angled twist, the part beyond the twist being bent to an obtuse angle A.

6. A slab lifter according to claim 1 in which the distance from the axis of rotation to the slab-gripping portion can be varied to suit different gripping distances L.

7. A slab lifter according to claim 6 in which each bar is composed of releasably secured elements relatively movable longitudinally for adjustment of length.

8. A slab lifter according to claim 1 having means capable of interacting with both bars near to the axis of rotation so as to maintain them releasably in a slab-gripping position.

9. A slab lifter according to claim 1 wherein said stabilizer means includes means to fix said stabilizer means to said one bar so that said stabilizer means is adjustably movable between first and second rigid positions relative to said gripping member associated with said one bar.

10. A slab lifter according, to claim 1, wherein said stabilizer means is integral with said one bar.

11. A slab lifter according to claim 1, in which said slab-gripping portion is formed with a bottom edge which is angled inwardly zero to 5 degrees to bear on a lower surface of a slab.

12. A slab lifter according to claim 11 in which the distance from the axis of rotation to said slab-gripping portion of one of said bars is approximately equal for 0.5 L/sine (A+a) where "a" is the angle of the bottom edge of said slab-gripping portion.

* * * * *